(12) United States Patent
Young et al.

(10) Patent No.: US 10,147,097 B2
(45) Date of Patent: Dec. 4, 2018

(54) SUPPORT TO CUSTOMER PLATFORM SYSTEM, METHOD, AND SERVER

(71) Applicant: Ruby Tech Corporation, Taipei (TW)

(72) Inventors: Yu-Che Young, Taipei (TW); Li-Te Chang, Taipei (TW); Chin-Piao Hung, Taipei (TW)

(73) Assignee: Ruby Tech Corporation, Taipei (TW)

( * ) Notice: Subject to any disclaimer, the term of this patent is extended or adjusted under 35 U.S.C. 154(b) by 193 days.

(21) Appl. No.: 15/016,299

(22) Filed: Feb. 5, 2016

(65) Prior Publication Data

US 2017/0083922 A1  Mar. 23, 2017

Related U.S. Application Data

(60) Provisional application No. 62/221,112, filed on Sep. 21, 2015.

(30) Foreign Application Priority Data

Nov. 4, 2015 (TW) .............................. 104136258 A

(51) Int. Cl.
  *G06F 15/16* (2006.01)
  *G06Q 30/00* (2012.01)
  *H04L 29/12* (2006.01)

(52) U.S. Cl.
  CPC .......... *G06Q 30/016* (2013.01); *H04L 61/256* (2013.01); *H04L 61/2514* (2013.01)

(58) Field of Classification Search
  None
  See application file for complete search history.

(56) References Cited

U.S. PATENT DOCUMENTS

| | | | |
|---|---|---|---|
| 7,260,597 B1 * | 8/2007 | Hofrichter | .......... H04L 12/2803 707/999.01 |
| 2006/0059107 A1 | 3/2006 | Elmore et al. | |
| 2013/0103749 A1 * | 4/2013 | Werth | .................. G06F 9/4446 709/203 |

OTHER PUBLICATIONS

"Office Action of Taiwan Counterpart Application", dated Nov. 11, 2016, p. 1-p. 4.

* cited by examiner

*Primary Examiner* — Padma Mundur
(74) *Attorney, Agent, or Firm* — Jcipmet

(57) ABSTRACT

The disclosure provides a support to customer platform system, method, and server to serve as a marketing service platform providing various channel functions including sales, planning, technical support, maintenance, and customer management and perform an interactive support service with Internet Protocol (IP) connected devices based on cloud computing. Accordingly, a vendor may realize a comprehensive support service by applying the embodiments of the disclosure without complicated professional training.

9 Claims, 12 Drawing Sheets

Switch Comparison

| Model Name | Switch 1 | Switch 2 | Switch 3 | Switch 4 |
|---|---|---|---|---|
| Product Picture | | | | |
| Product Description | 26 port PoE GbE L2+ Managed Switch | 26 port PoE GbE L2+ Managed Switch | 28 port PoE GbE GbE/10 GbE L2+ Managed Switch | 28 port PoE GbE GbE/10 GbE L2+ Managed Switch |
| ⊖ Port configuration | | | | |
| 10M/100M/1G RJ45 port | 24 | 24 | 24 | 24 |
| 100M/1G/2.5G RJ45 port | -- | -- | -- | -- |
| 100M/1G/10G RJ45 port | -- | -- | -- | -- |

FIG. 6

SUPPORT TO CUSTOMER PLATFORM SYSTEM, METHOD, AND SERVER

CROSS-REFERENCE TO RELATED APPLICATION

This application claims the priority benefits of U.S. provisional application Ser. No. 62/221,112, filed on Sep. 21, 2015 and Taiwan application serial no. 104136258, filed on Nov. 4, 2015. The entirety of each of the above-mentioned patent applications is hereby incorporated by reference herein and made a part of this specification.

BACKGROUND OF THE INVENTION

[Field of the Invention]

The disclosure relates to a diversified support to customer service, and in particular, a support to customer platform system, method, and server providing diversified support to customer services.

[Description of Related Art]

With the rapid development of technology, electronic devices of all kinds are becoming more and more widespread. To achieve the goal of sharing resources, the Internet has become the essential tool for information exchange, leading to dramatic growth in commercial and home-use Internet Protocol (IP) connected devices (e.g., smart phones, smart video cameras, wireless sharing devices, and smart TVs).

Generally speaking, salespersons of electronic devices can only provide single mode of service function. For example, the salespersons would describe the functions of specific products. However, most consumers need a comprehensive service before, during, and after a sale. In other words, the current mode of product sales fails to satisfy the needs of consumers, and salespersons can hardly provide a comprehensive service.

SUMMARY OF THE INVENTION

The disclosure provides a support to customer platform system, method, and server for facilitating a comprehensive service provided by vendors for consumers.

The disclosure provides a support to customer platform system. The support to customer platform system includes an Internet Protocol (IP) connected device and a support to customer server. The support to customer server allows the IP connected device to establish a connection via a network and provides channel functions for the IP connected device, and the IP connected device and the support to customer server establish an interactive support service based on one of the channel functions.

In one embodiment of the disclosure, the channel functions include one or a combination of a sales function, a planning function, a technical support function, a maintenance function, and a customer management function.

In one embodiment of the disclosure, regarding the sales function, the support to customer server provides the interactive support service related to product information. Regarding the planning function, the support to customer server provides the interactive support service related to configuring products. Regarding the technical support function, the support to customer server provides the interactive support service related to technical support. Regarding the customer management function, the support to customer server provides the interactive support service related to customer management.

In one embodiment of the disclosure, regarding the maintenance function, the interactive support service includes a remote management operation, wherein the support to customer server is located in a first network and the IP connected device is located in a second network. The IP connected device performs the remote management operation via the second network. The first network is different from the second network.

In one embodiment of the disclosure, the remote management operation includes a notification operation, the first network is a private network, and the second network is a public network. The support to customer server detects an alarm event in the private network and transmits the alarm event to the IP connected device via the public network to thereby perform the notification operation.

In one embodiment of the disclosure, the support to customer server is connected to an internal device in the private network via the connection to monitor the internal device and the connection and determine whether a monitoring result matches the alarm event.

In one embodiment of the disclosure, the remote management operation includes an authorization operation. The IP connected device transmits identity information to the support to customer server via the public network. The identity information corresponds to the IP connected device. The support to customer server enables the remote management operation according to the identity information to thereby complete the authorization operation.

In one embodiment of the disclosure, the remote management operation includes a device management operation. The support to customer server provides a network management system for the IP connected device. The network management system is used for controlling the internal device and the support to customer server in the private network. The IP connected device transmits a device management command to the support to customer server via the public network, and the support to customer server controls the network management system according to the device management command to thereby perform the device management operation.

The disclosure provides a support to customer method applicable to an IP connected device and a support to customer server. The support to customer method includes the following steps: allowing the IP connected device to establish a connection to the support to customer server via a network, providing channel functions for the IP connected device, and establishing an interactive support service based on one of the channel functions.

In one embodiment of the disclosure, regarding the sales function, the step of establishing the interactive support service based on one of the channel functions includes the following step: providing the interactive support service related to product information. Regarding the planning function, the step of establishing the interactive support service based on one of the channel functions includes the following step: providing the interactive support service related to configuring products. Regarding the technical support function, the step of establishing the interactive support service based on one of the channel functions includes the following step: providing the interactive support service related to technical support. Regarding the customer management function, the step of establishing the interactive support service based on one of the channel functions includes the following step: providing the interactive support service related to customer management.

In one embodiment of the disclosure, regarding the maintenance function, the interactive support service includes a remote management operation, the support to customer server is located in a first network, and the IP connected device is located in a second network. The step of establishing the interactive support service based on one of the channel functions includes the following steps: establishing a connection in the first network and performing the remote management operation via the second network, wherein the first network is different from the second network.

In one embodiment of the disclosure, the remote management operation includes a notification operation, the first network is a private network, and the second network is a public network. The step of performing the remote management operation via the second network includes the following steps: detecting an alarm event in the private network and transmitting the alarm event via the public network to thereby perform the notification operation.

In one embodiment of the disclosure, the support to customer server is connected to an internal device in the private network via the connection. The step of detecting the alarm event in the private network includes the following steps: monitoring the internal device, a network switch, and the connection, and determining whether a monitoring result matches the alarm event.

In one embodiment of the disclosure, the remote management operation includes an authorization operation. The step of performing the remote management operation via the public network includes the following steps: receiving identity information via the public network, wherein the identity information corresponds to the IP connected device located in the public network, and enabling the remote management operation according to the identity information to thereby complete the authorization operation.

In one embodiment of the disclosure, the remote management operation includes a device management operation. The step of performing the remote management operation via the public network includes the following steps: providing a network management system serving to control the internal device and the support to customer server in the private network, receiving a device management command via the public network, and controlling the network management system according to the device management command to thereby perform the device management operation.

The disclosure also provides a support to customer server. The support to customer server includes a communication module and a processing unit. The communication module is used for transmitting and receiving signals. The processing unit is coupled to the communication module and is configured to perform the following steps: allowing an IP connected device to establish a connection via a network through the communication module, providing channel functions for the IP connected device through the communication module and establishing an interactive support service based on one of the channel functions.

In light of the above, the support to customer system, method, and server provided in the embodiments of the disclosure provide a diversified marketing service platform for sales, planning, technical support, maintenance, and customer management and perform an interactive support service with users based on cloud computing. Accordingly, a manufacturer may realize a comprehensive support service by applying the embodiments of the disclosure without complicated professional training.

To provide a further understanding of the aforementioned and other features and advantages of the disclosure, exemplary embodiments, together with the reference drawings, are described in detail below.

BRIEF DESCRIPTION OF THE DRAWINGS

FIG. 6 is an example of product comparison.

DESCRIPTION OF THE EMBODIMENTS

Figure 1:
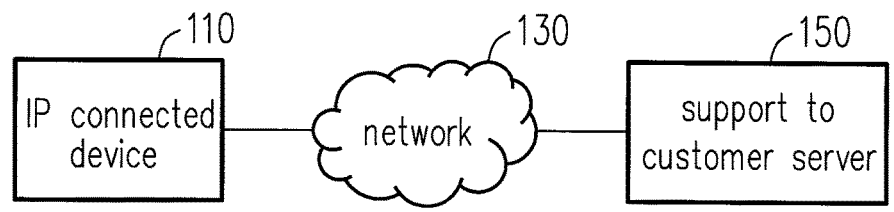
FIG. 1 is a schematic view illustrating a support to customer platform system according to one embodiment of the disclosure.

FIG. 1 is a schematic view illustrating a support to customer platform system according to one embodiment of the disclosure. A support to customer platform system 100 includes an IP connected device 110, a network 130, and a support to customer server 150. Note that the IP connected device 110 is not limited to the number illustrated in FIG. 1. People who apply the present embodiment of the disclosure may make adjustments according to their needs.

Figure 2:
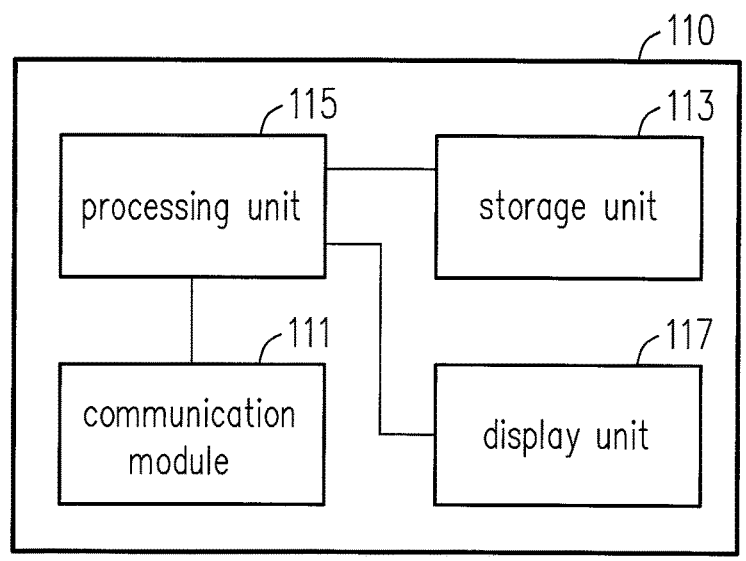
FIG. 2 is an element block diagram illustrating an IP connected device according to one embodiment of the disclosure.

The IP connected device 110 is a mobile device such as a smartphone and a tablet computer, or an electronic device such as a laptop, a personal computer, and a personal workstation, for example. FIG. 2 is an element block diagram illustrating the IP connected device 110 according to one embodiment of the disclosure. The IP connected device 110 includes a communication module 111, a storage unit 113, a processing unit 115, and a display unit 117.

The communication module 111 is a wireless network interface module of any type supporting the WiFi standards, the third generation wireless communications (3G), the fourth generation wireless communications (4G), or having other wireless transmission functions. Alternatively, the communication module 111 is a wired network interface module of any type supporting Ethernet, optical fibers, or having other wired transmission functions. The IP connected device 110 is connected to the network 130 through the communication module 111.

The storage unit 113 is a fixed or removable random access memory (RAM), read-only memory (ROM), flash memory of any type, a similar element, or a combination of the aforesaid elements.

The processing unit 115 is connected to the communication module 111 and the storage unit 113 and is a central processing unit (CPU) or another programmable general-purpose or specific-purpose microprocessor, digital signal processor (DSP), programmable controller, application specific integrated circuit (ASIC), another similar element, or a combination of the aforesaid elements. In the present embodiment of the disclosure, the processing unit 115 is used to perform all operations of the IP connected device 110.

The display unit 117, is a liquid crystal display (LCD), a light-emitting diode (LED) display, a field emission display (FED), or a display screen of another type, for example. The display unit 117 optionally has touch technologies including a touch function (capacitive, resistive, optical, or any type of touch technology), or has input devices such as a mouse and a keyboard. The display unit 117 is used to display a user interface (UI).

The network 130 is an internal network or the Internet. If the network 130 is an internal network, it means that the IP connected device 110 and the support to customer server 150 both belong to a local area network (LAN) or a private network. If the network 130 is the Internet, it means that the IP connected device 110 and the support to customer server 150 belong to different domains.

Figure 3:
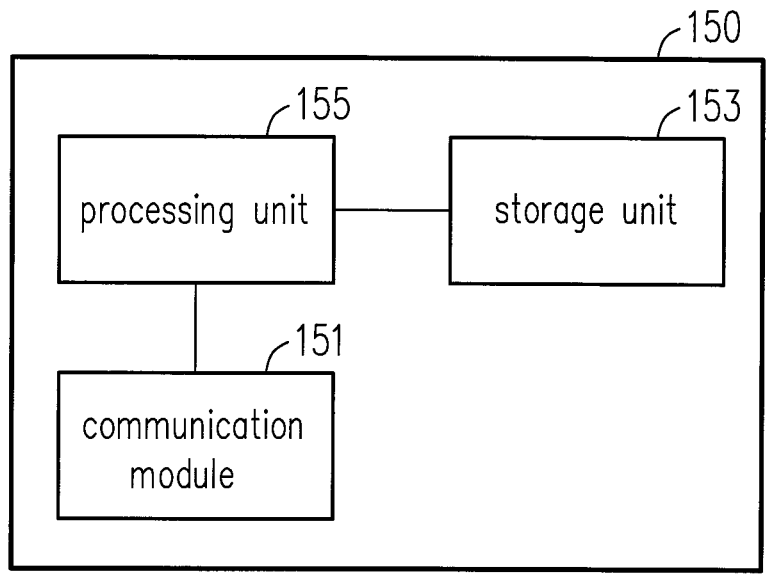
FIG. 3 is an element block diagram illustrating a support to customer server according to one embodiment of the disclosure.

The support to customer server 150 is a server of any type, such as a cloud server and a database server, or a server service established through a personal computer, a personal workstation, a network switch, etc. FIG. 3 is an element block diagram illustrating the support to customer server 150 according to one embodiment of the disclosure. The support to customer server 150 includes a communication module 151, a storage unit 153, and a processing unit 155.

Referring to the communication module 111, the storage unit 113, and the processing unit 115 in FIG. 2 for detailed descriptions of the communication module 151, the storage unit 153, and the processing unit 155, and those descriptions would not be repeated here. The processing unit 155 is used to process all operations of the support to customer server 150.

Figure 4:
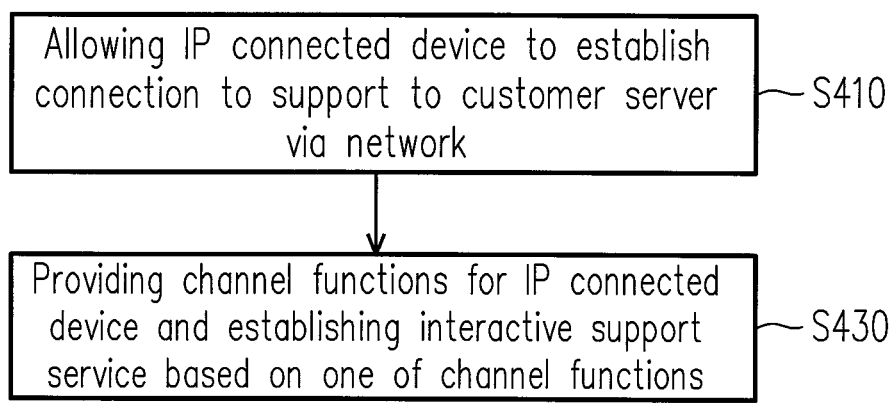
FIG. 4 is a flowchart illustrating a support to customer method according to one embodiment of the disclosure.

To have a clear understanding of the operational procedure of the present embodiment of the disclosure, numerous embodiments are provided below to detail a support to customer method of the support to customer platform system 100 of the present embodiment of the disclosure. FIG. 4 is a flowchart illustrating a support to customer method according to one embodiment of the disclosure. Referring to FIG. 4, the method of the present embodiment applies to each of the devices in the support to customer platform system 100 of FIG. 1. In the following description, the method of the present embodiment of the disclosure is illustrated with each of the elements and modules in the IP connected device 110 and the support to customer server 150. Each procedure of the present method is adjustable according to the actual situation of application and is not limited hereto.

In step S410, the processing unit 155 of the support to customer server 150 allows the IP connected device 110 to establish a connection through the communication module 111 via the network 130. Specifically, the processing unit 155 of the support to customer server 150 initiates, for example, a HyperText Transfer Protocol (HTTP) server (or a webpage server) (e.g, the Apache server and Internet Information Server (IIS)), to provide a webpage interface for various IP connected devices 110 connected to the support to customer server 150 via the network 130. The IP connected devices 110 execute a web browser (or other relevant programs based on the HTTP, the Telnet, or the Universal Plug and Play (UPnP) protocols) and input specific network addresses (e.g., IP addresses and port numbers), or specific virtual buttons or links on a program interface, to load the user interface provided by the support to customer server 150 and display the same through the display unit 117.

Note that the present embodiment of the disclosure is not limited to the webpage interface. The user interface displayed on the display unit 117 of the IP connected device 110 may also be a preset interface of the IP connected device 110. Moreover, the processing unit 115 of the IP connected device 110 obtains necessary information from the support to customer server 150 through the communication module 111 and presents the obtained information on the preset interface and is not limited hereto.

Next, in step S430, the support to customer server 150 provides channel functions for the IP connected device 110, and the IP connected device 110 and the support to customer server 150 establish an interactive support service based on one of the channel functions. In the present embodiment of the disclosure, the channel functions include one or a combination of a sales function, a planning function, a technical support function, a maintenance function, and a customer management function. In other words, the support to customer server 150 is capable of providing an interactive support service for the IP connected device 110 according to the channel functions at different sales stages; handling requests sent by the IP connected device 110 through cloud computing, accessing corresponding data stored in the storage unit 153, and then providing required service content.

In one embodiment, regarding the sales function, the support to customer server 150 provides the interactive support service related to product information. This interactive support service is a service provided at the product sale stage, including providing product information, selecting product specifications, comparing products, sharing results, etc. The processing unit 155 of the support to customer server 150 provides an interface related to product information for the display unit 117 of the IP connected device 110 to present.

Figure 5:
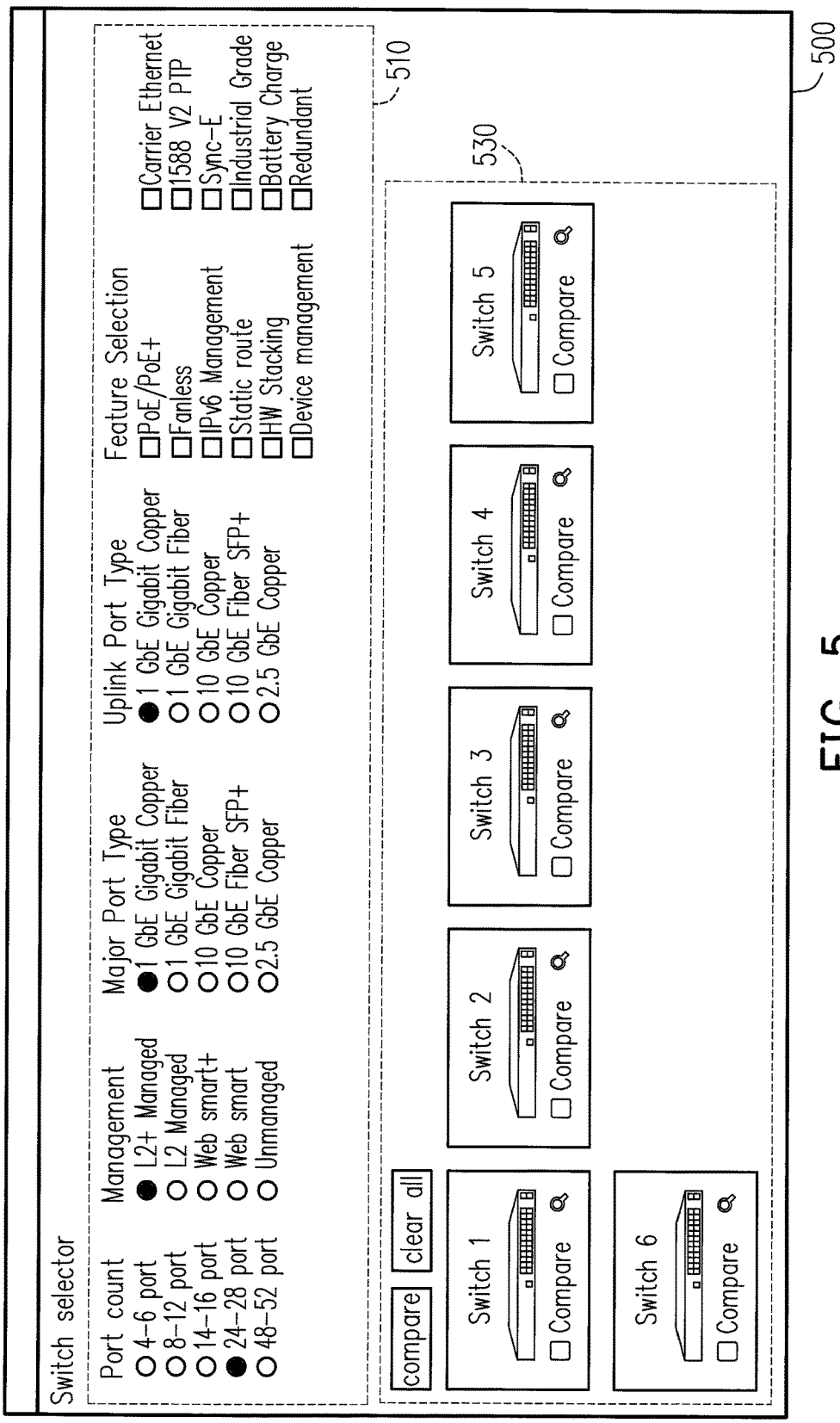
FIG. 5 is an example of selection of product specifications.

For example, FIG. 5 is an example of selection of product specifications. Referring to FIG. 5, a specification selection interface 500 includes a specification selection section 510 and a product presentation section 530. The processing unit 155 of the support to customer server 150 presents corresponding product content through the product presentation section 530 according to the selection of the IP connected device 110 on the specification selection section 510. For example, if the selection in the specification selection section 510 is 24-28 connection ports, L2+ management, 1 Gigabit Ethernet (GbE) copper, etc., and the product presentation section 530 will present products conforming with the selected specifications. Moreover, the processing unit 155 of the support to customer server 150 further provides a comparison of products according to a user's selecting operations of each product on the product presentation section 530.

FIG. 6 is an example of product comparison. Referring to FIG. 6, a product comparison interface 600 includes a product comparison section 610 and a share button 630. In response to the selecting operations of products on the product presentation section 530 in FIG. 5, the product comparison section 610 presents a comparison of selected products according to the specifications. In response to the user's click operation on the share button 630, the processing unit 155 of the support to customer server 150 further converts product comparison information into specific files (e.g., doc, pdf, and jpge files) and shares the files by sending an e-mail or downloading.

Note that the specification selection interface 500 and the product comparison interface 600 in FIGS. 5 and 6 may present different content according to different design needs, and the present embodiment of the disclosure is not limited hereto.

In another embodiment, regarding the planning function, the support to customer server 150 provides the interactive support service related to configuring products. This interactive support service is a service provided for needs concerning product functions (e.g., requirement of network configuration and specifications), capacity of product use (e.g., numbers of staff and floors of a company), and environment configuration, such that the processing unit 155 of the support to customer server 150 can establish an environment structure for products according to the needs.

Figure 7A:
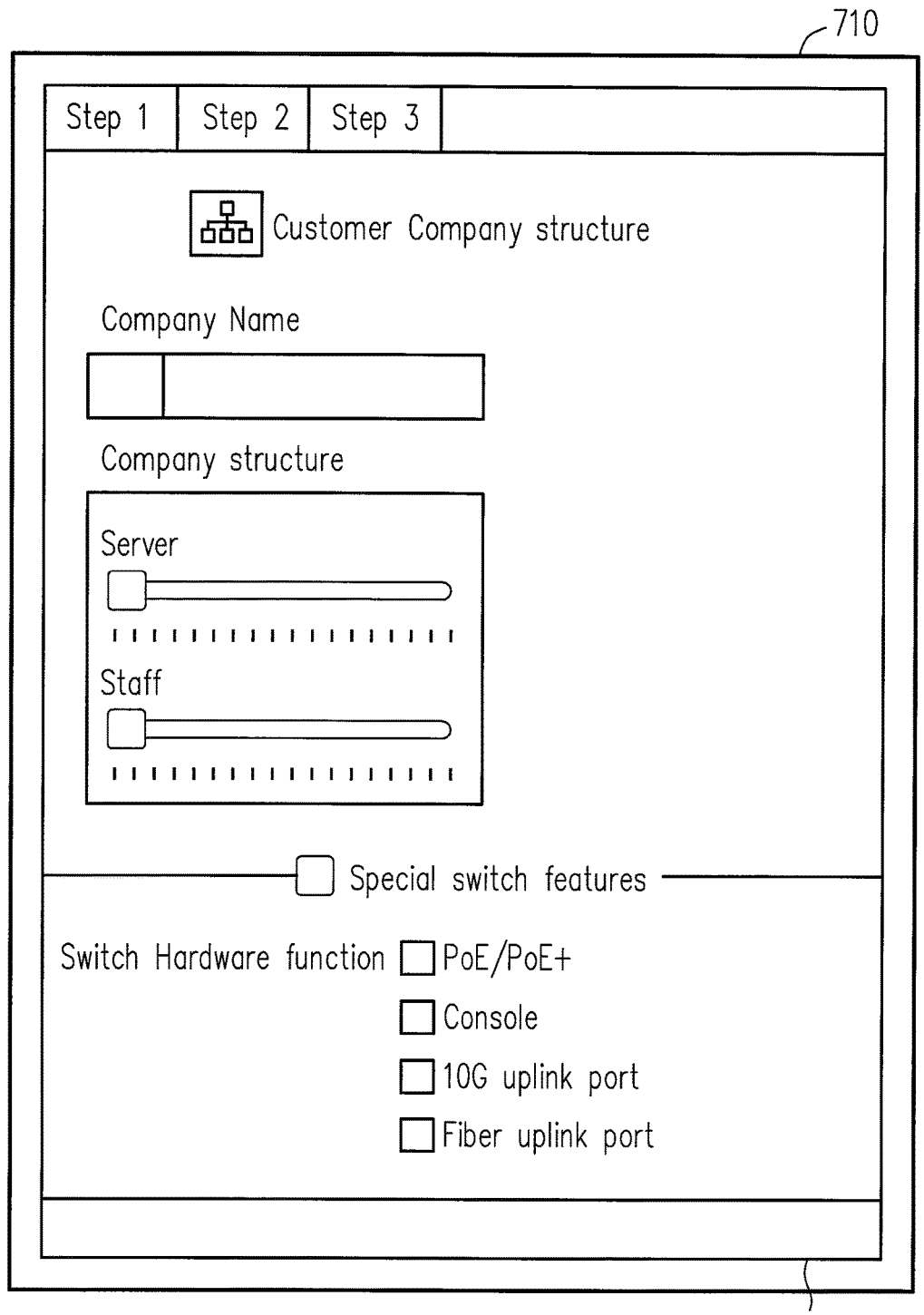
FIG. 7A and FIG. 7B are examples of a product planning interface.
Figure 7B:
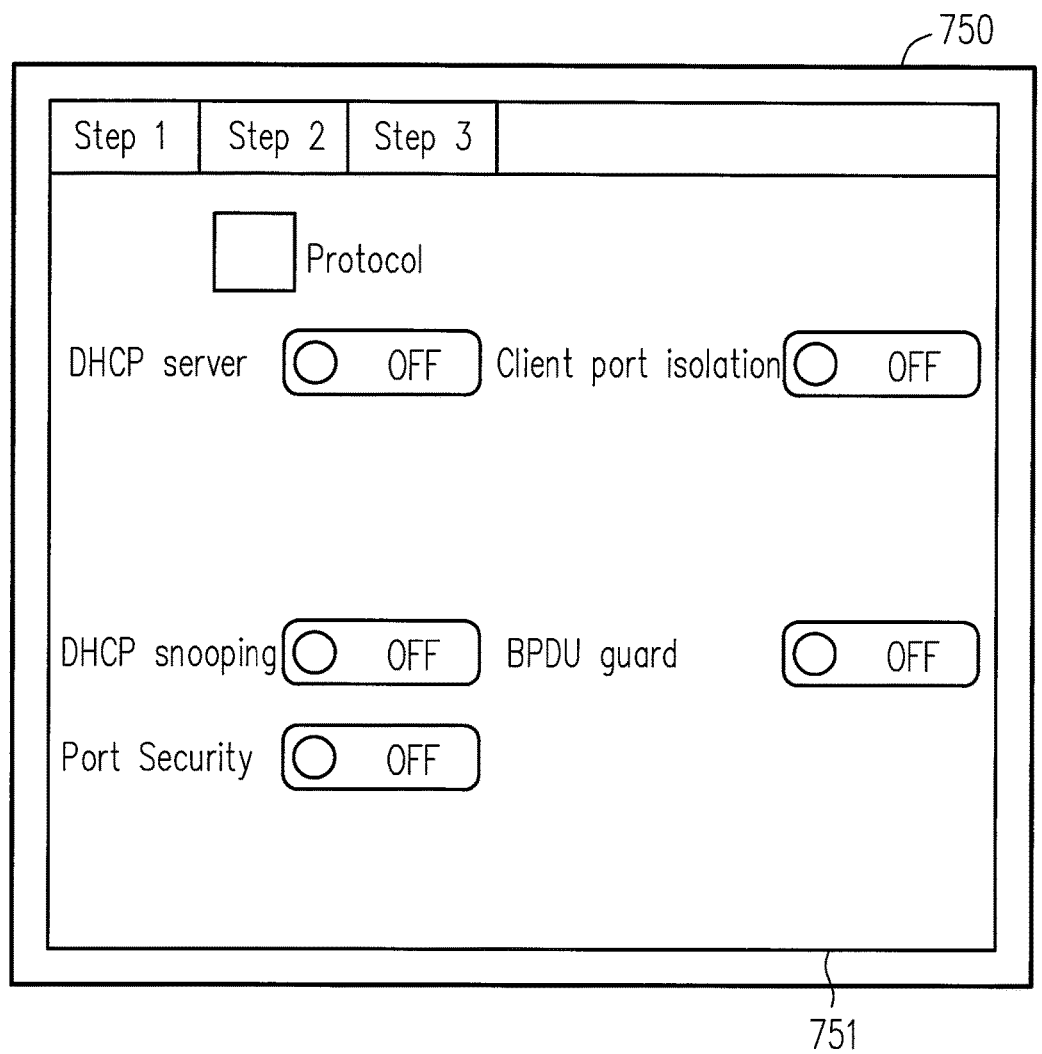

For example, FIG. 7A and FIG. 7B are examples of a product planning interface. Referring to FIG. 7A first, a product planning interface 710 presents an information input block 711. Through the communication module 151, the support to customer server 150 receives input operations related to, for example, a company name, a staff number, and specific functions, and transmitted by the IP connected device 110 regarding the information input block 711. Next, referring to FIG. 7B, the product planning interface 750 presents an information input block 751. The support to customer server 150 receives selecting operations related to, for example, communication protocols and security, and transmitted by the IP connected device 110 regarding the information input block 751 through the communication module 151. The support to customer server 150 further receives input operations related to, for example, account setting and subnet configuration, and transmitted by the IP connected device 110 through the communication module 151. Next, based on the received input information, the processing unit 155 of the support to customer server 150 further computes corresponding environment structure information and provides the environment structure information for the IP connected device 110 through the communication module 151.

Note that the product planning interfaces 710, 750 in FIGS. 7A and 7B may present different content according to different design needs, and the present embodiment of the disclosure is not limited hereto.

In one embodiment, regarding the technical support function, the support to customer server 150 provides the interactive support service related to technical support. This interactive support service is a service concerning technical Q & A, operational instruction, result analysis, etc. in each of the channel functions, and is adjustable according content of different channel functions. For example, the specification selection interface 500 in FIG. 5, the product comparison interface 600 in FIG. 6, and the product planning interfaces 710, 750 in FIGS. 7A and 7B present a technical inquiry button to receive inquiry requests transmitted by the IP connected device 110.

Figure 8:
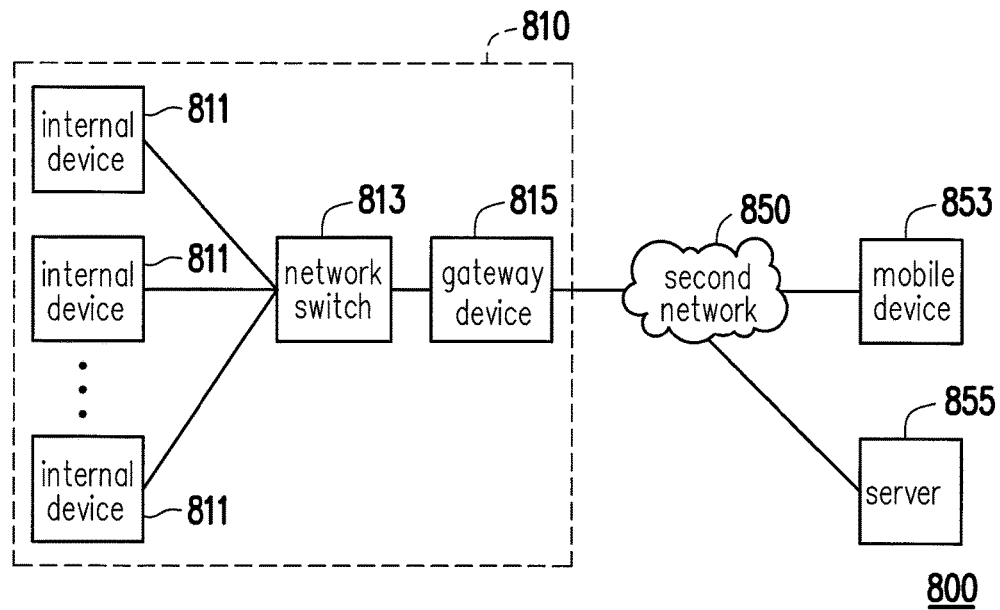
FIG. 8 is a schematic view illustrating a remote management system according to one embodiment of the disclosure.

In another embodiment, regarding the maintenance function, the interactive support service includes a remote management operation. FIG. 8 is a schematic view illustrating a remote management system according to one embodiment of the disclosure. Referring to FIG. 8, a remote management system 800 includes one ore more internal devices 811, one or more network switches 813, a gateway device 815, a second network 850, one or more mobile devices 853, and one or more servers 855. In the present embodiment, the network switch 813 is an example of the interactive support to customer server 150 in FIG. 1 and the mobile device 853 is an example of the IP connected device 110. Note that the internal device 811, the network switch 813, the mobile device 853, and the server 855 are not limited to the numbers illustrated in FIG. 8. People who apply the present embodiment of the disclosure may make adjustments according to their needs.

The internal device 811 is an IP connected device, such as a computer, a wireless sharing device, a server, a smartphone, a display device, a smart video camera, a router, and a network switch, which performs data transmission with another internal device 811 and the network switch 813 based on at least one network protocol (e.g., the Internet Protocol (IP), the Transmission Control Protocol (TCP), the User Datagram Protocol (UDP), and etc.), or is connected to the second network 850 through the gateway device 815.

Figure 9:
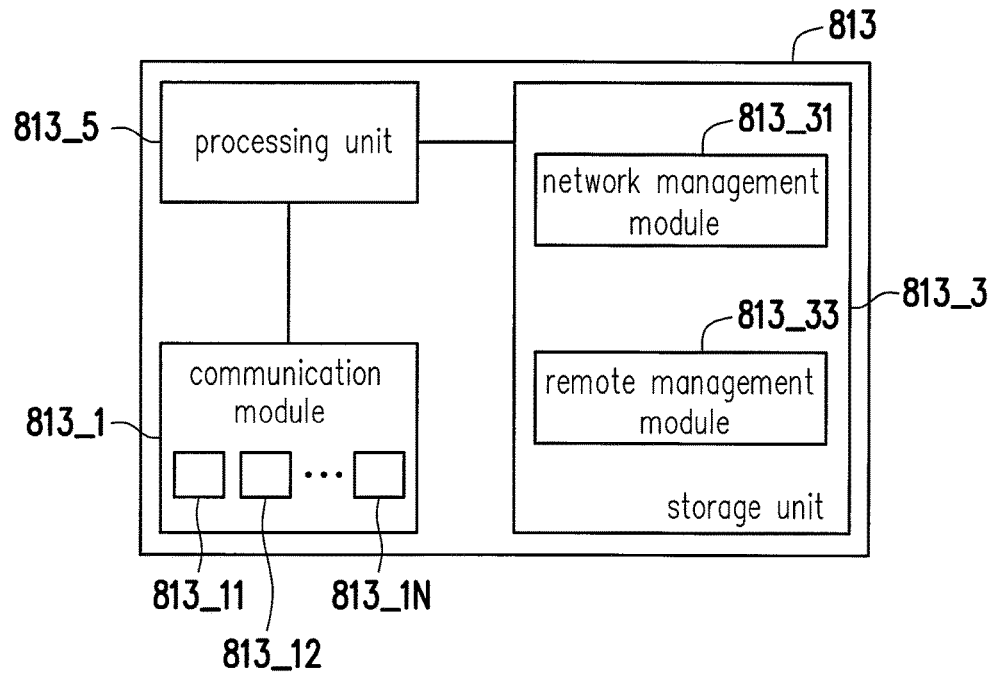
FIG. 9 is an element block diagram illustrating a network switch according to one embodiment of the disclosure.

Next, referring to FIG. 9, which is an element block diagram illustrating the network switch 813. The network switch 813 at least includes a communication module 813_1, a storage unit 813_3, and a processing unit 813_5. The communication module 813_1 at least supports IEEE 802.3/ab/u/x/z Ethernet standards and includes one or more connection ports 813_11 to 813_1N, wherein N is a positive integer. Each of the connection ports 813_11 to 813_1N includes interfaces of RJ45 or optical fibers (e.g., a small form-factor pluggable (SFP)) supporting transmission rates at 10 and 100 Mbps and/or 1 and 10 Gbps. Each of the internal devices 811 is directly or indirectly connected to the network switch 813 respectively via the connection ports 813_11 to 813_1N. Note that the communication module 813_1 also supports standards including IEEE 802.1Q/p/X/D/w/AB and is adjustable according to different design needs, and the present embodiment of the disclosure is not limited hereto. Indirect connection means that the internal device 811 and the network switch 813 may be cascadely connected to each other by another network switch 813, a router, or other devices.

Referring to relevant description of the storage unit 153 in FIG. 3 for an embodiment of the storage unit 813_3. In the present embodiment, the storage unit 813_3 is used to record relevant information and data files of different types of software programs including a device management module 813_31 and a remote management module 813_33, a network management system (NMS), and the internal device 811. Detailed descriptions of each of the modules 813_31 and 813_33 and the network management system will be provided in embodiments below.

The processing unit 813_5 is connected to the communication module 813_1 and the storage unit 813_3. Referring to relevant description of the processing unit 155 in FIG. 3 for an embodiment thereof. In the present embodiment of the disclosure, the processing unit 813_5 is used to perform all operations of the network switch 813 and is capable of accessing and executing the modules recorded in the storage unit 813_3 described above.

The gateway device 815 is an IP sharing device or a router. The internal device 811, the network switch 813, and the gateway device 815 are connected to each other to form a first network 810. The first network 810 is different from the second network 850. In the present embodiment, the first network 810 is a private network (or a local area network (LAN)), and the second network 850 is a public network (or the Internet). The internal device 811 and the network switch 813 are connected to the second network 850 through the gateway device 815. When packets from the second network 850 reach the gateway device 815, the gateway device 815, for example, translates target addresses belonging to the second network 850 as indicated by the packets into network addresses of the first network 810 based on the Network Address Translation (NAT) mechanism, thereby transmitting the packets to the internal device 811 or the network switch 813 in the first network 810. Moreover, when packets from the first network 810 reach the gateway device 815, the gateway device 815 translates source addresses belonging to the first network 810 as indicated by the packets into network addresses of the second network 850, thereby transmitting the packets to the second network 850. In addition, the gateway device 815 further at least supports communication protocols including the Universal Plug and Play (UPnP) and NAT Traversal.

In the present embodiment, the server 855 is a server capable of sending push messages to the mobile device 853, such as a push server (e.g., Apple Push Notification Service (APNS) and Google Cloud Messaging (GCM)), a cloud server, and a management server.

Figure 10:
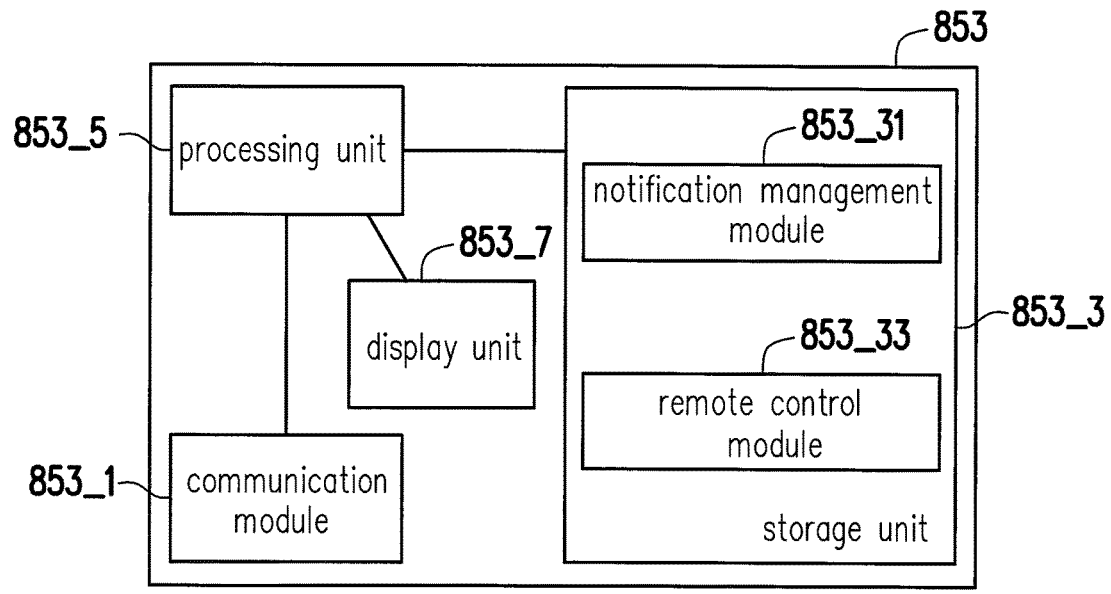
FIG. 10 is an element block diagram illustrating a mobile device according to one embodiment of the disclosure.

The mobile device 853 is an electronic device such as a smartphone, a tablet computer, and a laptop. FIG. 10 is an element block diagram illustrating the mobile device 853 according to one embodiment of the disclosure. Referring to FIG. 10, the mobile device 853 at least includes a communication module 853_1, a storage unit 853_3, a processing unit 853_5, and a display unit 853_7. The communication module 853_1 is a wireless network interface module of any type supporting the WiFi standards, the third generation wireless communications (3G), the fourth generation wireless communications (4G), or having other wireless transmission functions. The mobile device 853 is connected to the second network 850 through the communication module 853_1.

Referring to relevant description of the storage unit 113 in FIG. 2 for an embodiment of the storage unit 853_3. In the present embodiment, the storage unit 853_3 is used to record software programs including a notification management module 853_31 and a remote control module 853_33 and a mobile control program. Detailed descriptions of each of the modules 853_31 and 853_33 and the mobile control program will be provided in embodiments below.

The processing unit 853_5 is connected to the communication module 853_1 and the storage unit 853_3. Referring to relevant description of the processing unit 115 in FIG. 2 for an embodiment thereof. In the present embodiment of the disclosure, the processing unit 853_5 is used to perform all operations of the mobile device 853 and is capable of accessing and executing the modules recorded in the storage unit 853_3 described above. Note that the processing unit 853_5 runs operating systems (e.g., Android and iOS) to load the mobile control program. Referring to relevant description of the display unit 117 in FIG. 2 for an embodiment of the display unit 853_7.

Figure 11:
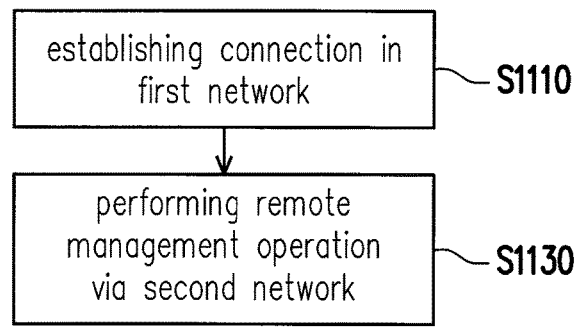
FIG. 11 is a flowchart illustrating a remote management method according to one embodiment of the disclosure.

To have a clear understanding of the operational procedure of the present embodiment of the disclosure, numerous embodiments are provided below to detail a remote management method of the remote management system 800 of the present embodiment of the disclosure. FIG. 11 is a flowchart of a remote management method according to one embodiment of the disclosure. Referring to FIG. 11, the method of the present embodiment applies to each of the devices in the remote management system 800 of FIG. 8. In the following description, the method of the present embodiment of the disclosure is illustrated with each of the elements and modules in the network switch 813 and the mobile device 853. Each procedure of the present method is adjustable according to the actual situation of application and is not limited hereto.

In step S1110, the network management module 813_31 of the network switch 813 establishes a connection in the first network 810 through the communication module 813_1. In the present embodiment, the communication module 813_1 establishes a connection to the internal device 811 in the first network 810 via the corresponding connection ports 813_11 to 813_1N. Moreover, the communication module 813_1 also establishes a connection to the gateway device 815 via the corresponding connection ports 813_11 to 813_1N.

Next, in step S1130, the remote control module 853_33 of the mobile device 853 performs a remote management operation with the network switch 813 through the communication module 853_1 via the second network 850. Specifically, to allow a network administrator to manage and monitor each of the internal devices 811 and the network switch 813 in the first network 810 anytime and anywhere, the present embodiment of the disclosure allows the network administrator to remote control the network management system of the network switch 813 through the mobile device 853. The network management system is used to control the internal devices 811 and the network switch 813 in the first network 810 and perform device management operations including network configuration setting, performance monitoring, link state monitoring, abnormal event monitoring, or other specific control operations on the internal devices 811 and the network switch 813.

In one embodiment, the remote management operation includes an authorization operation for allowing the mobile device 853 to further access the network management system of the network switch 813 in the first network 810 while ensuring information security of the first network 810. The remote control module 853_33 receives identity information through the communication module 853_1 via the second network 850, and the identity information corresponds to the module device 853 located in the second network 850. Moreover, the remote management module 813_33 enables the remote management operation according to the identity information to thereby complete the authorization operation.

Figure 12:
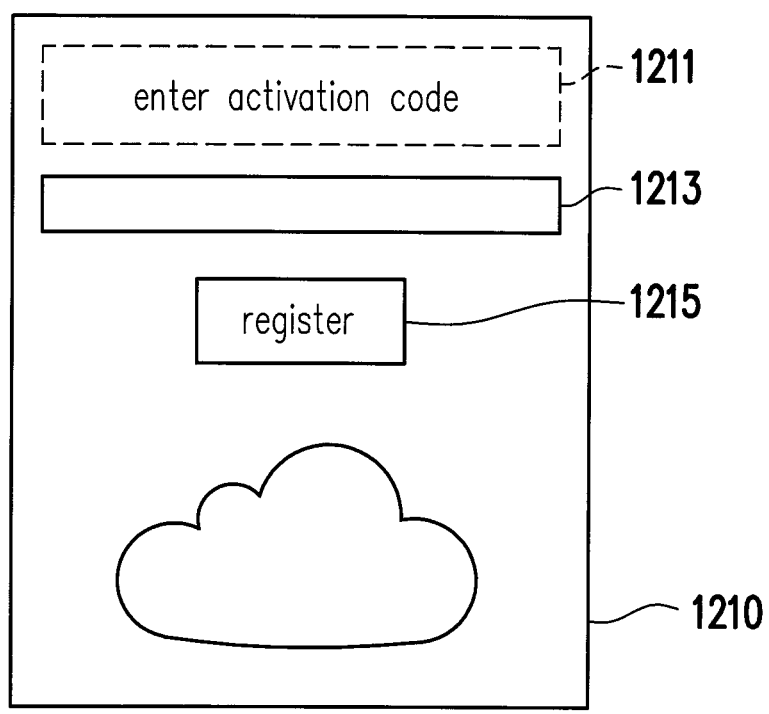
FIG. 12 is an example of part of a user interface of an authorization operation.

Specifically, the mobile control program loaded on the mobile device 853 presents a user interface thereof through the display unit 853_7, and the remote control module 853_33 detects the user's touch operations (e.g., selecting, dragging, and text inputting) on the display unit 853_7. Referring to an example of part of the user interface of the authorization operation illustrated in FIG. 12. After the remote control module 853_33 receives the user's operation of adding a device with respect to the network switch 813 as performed on the user interface (e.g., inputting a network address such as a Uniform/Universal Resource Locator (URL), an IP address, and/or a port number, of the network switch 813, or specific identification information of the network switch 813), the user interface 1210 presents an instruction 1211 for inputting an activation code. The remote control module 853_33 receives the user's input operation (namely, inputting the activation code) in an input field 1213 through the display unit 853_7 or another input unit (e.g., a keyboard and a mouse) and detects the user's selecting operation on a button 1215. Next, through the communication module 853_1, the remote control module 853_33 transmits the activation code and the identity information of the mobile device 853 to an authorization server (e.g., the server 855) via the second network 850. The identity information is a device name and a model number of the mobile device 853, and/or a network address of the second network 850.

Next, the authorization server performs a registration operation based on the activation code. If registration is successful, it is determined that the mobile device 853 may access the network management system of the network switch 813. The authorization server or the mobile device 853 directly transmits the identity information of the mobile device 853 to the network switch 813 via the second network 850. In response to the received identity information of the mobile device 853, the remote management module 813_33 of the network switch 813 enables the remote management operation with the mobile device 853 (e.g., a notification operation, a device management operation, etc. described later in embodiments below). In addition, if registration fails due to the identity information of the mobile device 853 (for example, the activation code does not match or the network switch 813 is not yet registered at the authorization server), the authorization server determines that the mobile device 853 may not access the network management system of the network switch 813. Moreover, the remote management module 813_33 of the network switch 813 is further capable of disabling or forbidding the remote management operation with the network switch 813.

In one embodiment, the remote management operation includes the notification operation. The network management module 813_31 of the network switch 813 detects an alarm event in the first network 810 through the communication module 813_1. Next, the remote management module 813_33 transmits the alarm event to the mobile device 853 through the communication module 813_1 via the server 855 located in the second network 850 to thereby perform the notification operation.

In the present embodiment, the network management module 813_31 monitors connections of all links among the internal devices 811, the network switch 813, and the first network 810 and determines whether a monitoring result matches the alarm event. The network management module 813_31 analyzes records of the network management system including log-in records and connection status and determines whether those records match predefined alarm events (for example, an erroneous password, log-in by an account, traffic exceeding a specific threshold, disconnection, etc.). Note that the alarm events are adjustable according to the needs.

If the network management module 813_31 determines that the record of the network management system matches the alarm event, a notification packet is transmitted through the communication module 813_1 to the server 855 via the gateway device 815 and the second network 850. The notification packet includes identification information (e.g., a device token or registration identification (ID)) and payload of the mobile device 853 or the mobile control program loaded thereon. The payload is relevant information (e.g., an erroneous password or disconnection) of the alarm event, a specific image of the mobile control program, or a sound to be played upon receipt of a message, to be displayed on the display unit 853_7 of the mobile device 853, which is adjustable by people applying the present embodiment of the disclosure according to different design needs.

Next, based on authorization information of the mobile control program, the server 855 pushes the notification packet to the mobile device 853 via the second network 850. Next, the notification management module 853_31 of the mobile device 853 receives the notification packet through the communication module 853_1 and presents information of the notification message through the display unit 853_7 according to the notification packet, or presents the relevant information of the alarm event through the user interface of the mobile control program.

Figure 13:
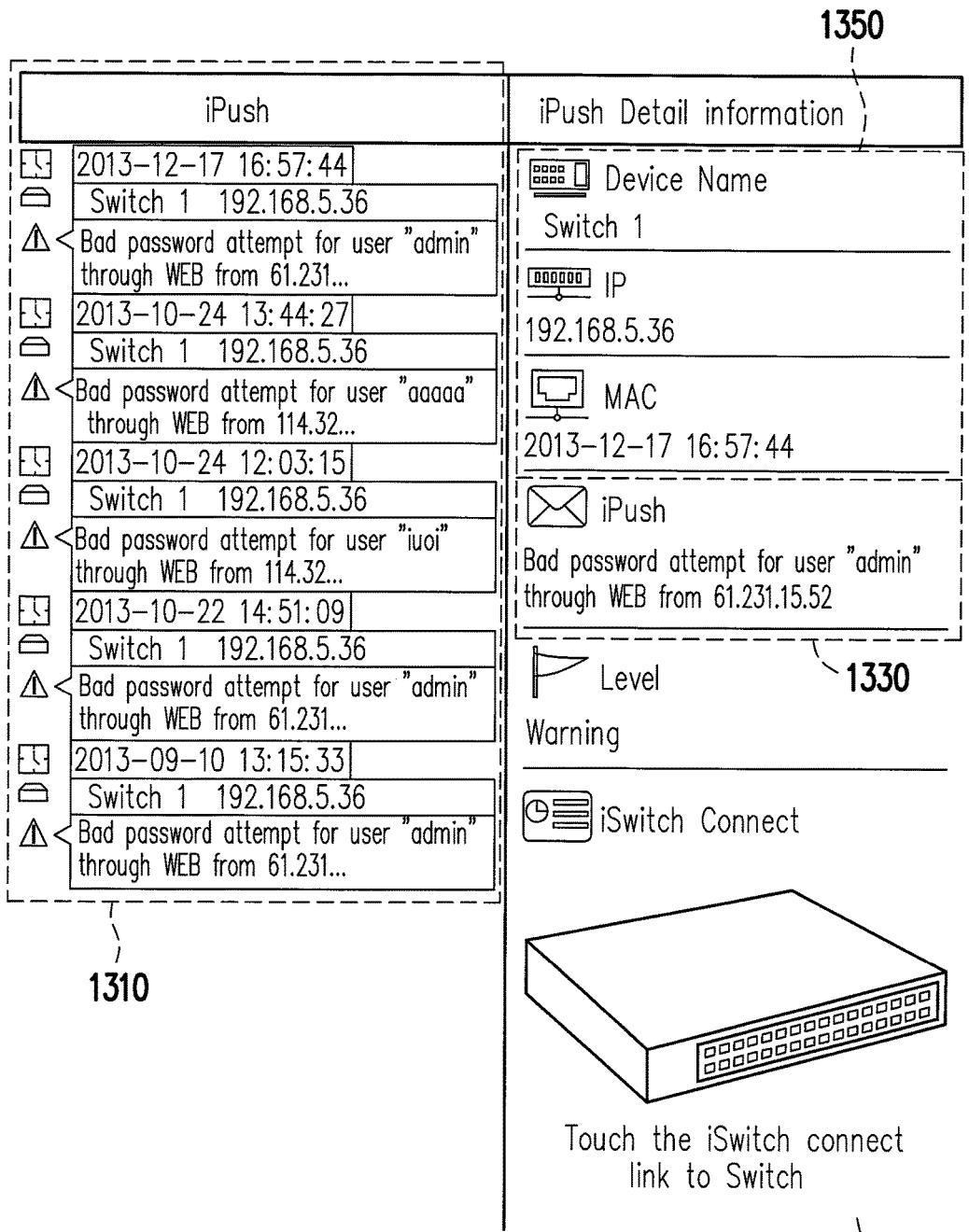
FIG. 13 is an example of a user interface of a notification operation.

For example, FIG. 13 is an example of the user interface of the notification operation. Referring to FIG. 13, an alarm event display section 1310 in a user interface 1300 arranges alarm events (which include content of an event, a device name, time, etc.) reported by the network switch 813 in a temporal order. Moreover, the user interface 1300 presents recent alarm events in a latest alarm event section 1330. On the other hand, the user interface 1300 also presents relevant information (e.g., a device name, an IP address, and a media access control (MAC) address) of the network switch 813 in an information presentation section 1350.

Note that all presented content of information (e.g., relevant information content and alarm event content) and visual design (e.g., figures, texts, colors, sizes, and arrangements) in FIG. 13 are adjustable according to the design needs and the disclosure is not limited hereto.

In another embodiment, the remote management operation includes the device management operation. The remote management module 813_33 provides the network management system for the mobile device 853. The remote management module 813_33 receives a device management command through the communication module 813_1 via the second network 850. The network management module 813_31 controls the network management system according to the device management command to thereby perform the device management operation.

Specifically, in addition to the aforesaid notification operation from an internal network (private network) to an external network (public network), the present embodiment of the disclosure further provides a remote management operation from the external network to the internal network. In response to receipt of the user's selecting operations of an alarm event (e.g., the latest alarm event section 1330 and the alarm event display section 1310 in FIG. 13), a specific figure, a section, a text, or a message as preformed on the user interface of the mobile control program, the remote control module 853_33 of the mobile device 853 controls the network management system of the network switch 813 based on communication protocols such as the UPnP and Transport Layer Security (TLC). The remote management module 813_33 of the network switch 813 and the remote control module 853_33 of the mobile device 853 transmit packets to each other to present the user interface of the network management system through the display unit 853_7 (or to load the user interface through a web browser). The remote control module 853_33 of the mobile device 853 receives the user's control operation of the internal devices 811 and/or the network switch 813 as performed on the user interface of the network management system. The control operation is used to perform device management operations on the internal devices 811 and/or the network switch 813, including network configuration setting, performance monitoring, link state monitoring, abnormal event monitoring, power management, etc. The remote control module 853_33 generates a corresponding device management command based on the control operation on the user interface and transmits the device management command to the network switch 813 through the communication module 813_1 via the second network 850. In response to receipt of the device management command, the network management module 813_31 of the network switch 813 performs the corresponding device management operation to control the internal devices 811 and the network switch 813 in the first network

810. In other words, the mobile device 853 is capable of performing a proxy operation on the network management system of the network switch 813 in the first network 810 via the second network 850.

Figure 14:
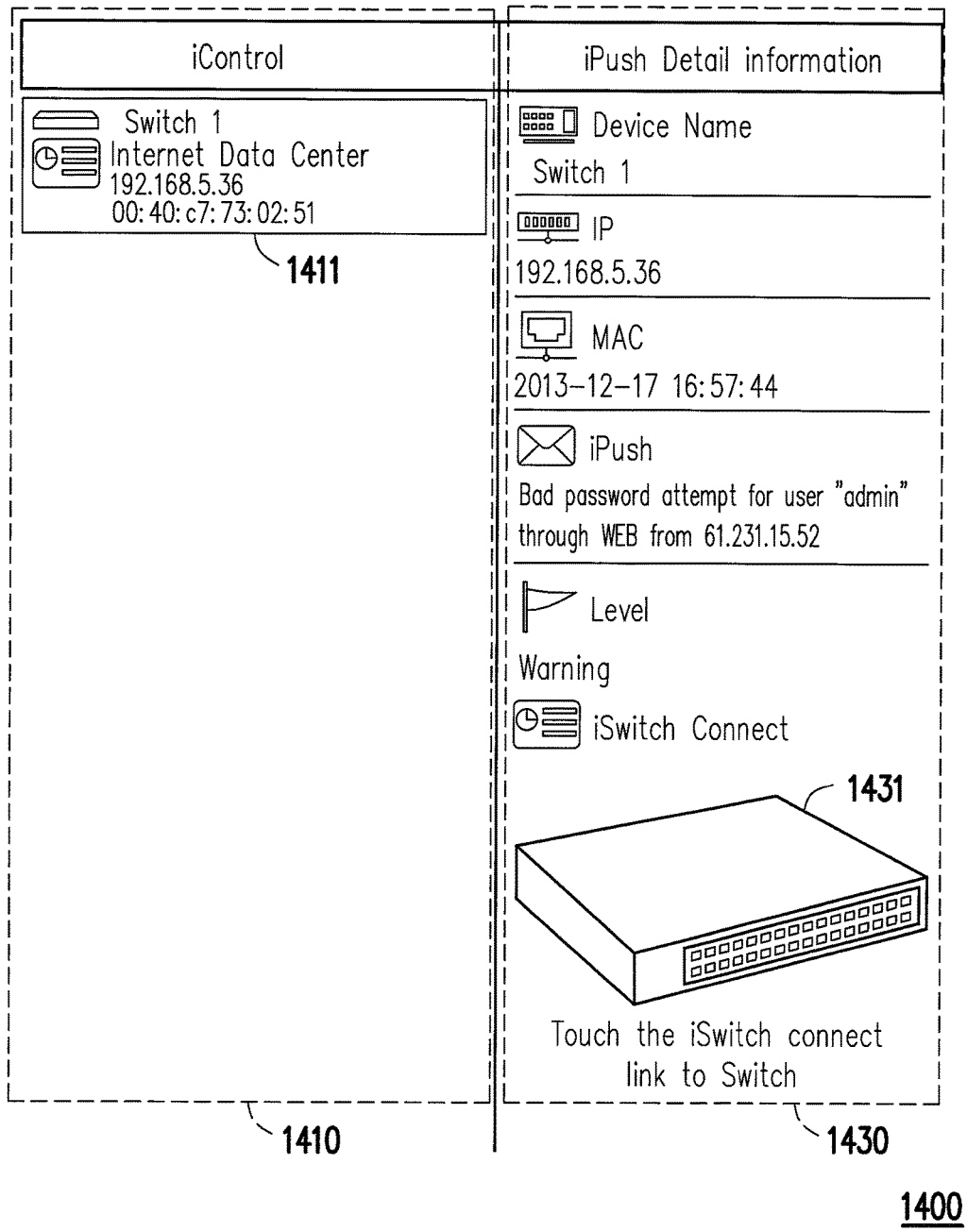
FIG. 14 is an example of a user interface of a device management operation.

For example, FIG. 14 is an example of a user interface of device management operations. Referring to FIG. 14, a device display section 1410 in a user interface 1400 shows that the mobile device 853 may control the network switch 813 (presented as a device option 1411, which presents part of information of the network switch 813) located in the first network 810. An information presentation section 1430 presents relevant information of the network switch 813 and a device option 1431. In response to receipt of a selecting operation of the device option 1411 or 1431, the remote control module 853_33 of the mobile device 853 logs in the network management system of the network switch 813 and displays the user interface of the network management system through the display unit 853_7.

Thereby, the network switch 813 enables the IP connected device 110 located in the public network to receive an alarm message reported by the network switch 813 in the private network, and the network management system of the network switch 813 may be reversely controlled from the public network. Nowadays, with the popularized use of mobile network, the network administrator is able to control networking status of each of the IP connected devices in the private network through the IP connected device 110 anytime and anywhere, and thereby instantly discover a problem and promptly detect an error.

Note that the disclosure does not limit the content of the device management operation and the network management system. People who apply the present embodiment of the disclosure may make adjustments on their own. In addition, all presented content of information (e.g., relevant information content and device option content) and visual design (e.g., figures, texts, colors, sizes, and arrangements) in FIG. 14 are adjustable according to the design needs and the disclosure is not limited hereto.

In another embodiment, regarding the customer management function, the support to customer server 150 provides the interactive support service related to customer management. This interactive support service is a customer management-related service, such as engineering, procurement, and construction (EPC), customer relationship management (CRM), enterprise resource planning (ERP), and etc.

Figure 15:
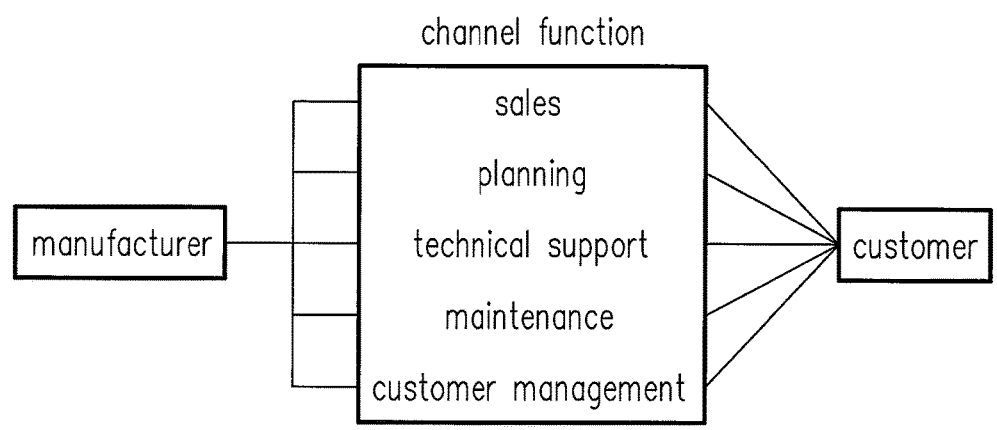
FIG. 15 is a schematic view of a support to customer platform.

FIG. 15 is a schematic view of a support to customer platform. Referring to FIG. 15, with the channel functions provided by the support to customer server 150, including the sales function, the planning function, the technical support function, the maintenance function, and the customer management function, the vendor is able to provide a comprehensive interactive support service for its customers.

In summary of the above, the embodiments of the disclosure disclose the support to customer system, method, and server. The support to customer system receives requests for various channel functions including sales, planning, technical support, maintenance, and customer management from the IP connected device. Based on the technical information stored in the database, a corresponding response is transmitted to the IP connected device after cloud computing to thereby provide an interactive support service. Accordingly, through the embodiments of the disclosure, a convenient, professional, intelligent, and rapid service would be provided for both the vendors of products and the customer who bought or intend to buy the products.

Although the disclosure is disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below.

What is claimed is:

1. A customer platform system comprising:
   a first Internet Protocol (IP) connected device, located in a public network;
   at least one second IP connected device, located in a private network; and
   a customer service server, located in the private network and connected to the at least one second IP connected device in the private network, allowing the first IP connected device to establish a connection to the customer service server, and providing at least one channel function via the connection for the first IP connected device, and the first IP connected device and the customer service server establishing an interactive support service based on one of the at least one channel function,
   wherein the at least one channel function comprises a maintenance function, the interactive support service comprises at least one remote management operation,
   wherein regarding the maintenance function, the at least one remote management operation comprises:
      a notification operation, wherein in the notification operation, the customer service server monitors links among the customer service server and the at least one second IP connected device in the private network, determines whether connection status of the links and log-in records of a network management system match at least one alarm event, and transmits the at least one alarm event to the first IP connected device via the public network, wherein the customer service server operates the network management system for controlling the at least one second IP connected device and the customer service server in the private network; and
      a device management operation, wherein in the device management operation, the first IP connected device logs in the network management system as a network administrator of the network management system via the public network, wherein acting as the network administrator is a proxy of the customer service server in the network management system.

2. The customer platform system according to claim 1, wherein the at least one channel function comprises one or a combination of a sales function, a planning function, a technical support function, and a customer management function.

3. The customer platform system according to claim 2, where regarding the sales function, the customer service server provides the interactive support service related to product information;
   regarding the planning function, the customer service server provides the interactive support service related to configuring products;
   regarding the technical support function, the customer service server provides the interactive support service related to technical support; and
   regarding the customer management function, the customer service server provides the interactive support service related to customer management.

4. The customer platform system according to claim 1, wherein the at least one remote management operation comprises:

an authorization operation, wherein in the authorization, the first IP connected device transmits identity information to the customer service server via the public network, and the customer service server enables the at least one remote management operation according to the identity information, wherein the identity information corresponds to the first IP connected device.

5. A customer support method, applicable to a first Internet Protocol (IP) connected device located in a public network, a customer service server and at least one second IP connected device located in a private network, the customer support method comprising:
    allowing the first IP connected device to establish a connection to the customer service server; and
    providing at least one channel function via the connection for the first IP connected device and establishing an interactive support service based on one of the at least one channel function,
    wherein the at least one channel function comprises a maintenance function, the interactive support service comprises at least one remote management operation and regarding the maintenance function, the step of establishing the interactive support service based on one of the at least one channel function comprising:
    establishing the connection in the public network to the customer service server; and
    performing the at least one remote management operation via the private network,
    wherein the at least one remote management operation comprises a notification operation, and the step of performing the at least one remote management operation via the private network comprising:
    monitoring links among the customer service server and the at least one second IP connected device in the private network;
    determining whether connection status of the links and log-in records of a network management system match at least one alarm event, wherein the customer service server operates the network management system for controlling the at least one second IP connected device and the customer service server in the private network; and
    transmitting the at least one alarm event via the public network to the first IP connected device;
    wherein the at least one remote management operation comprises a device management operation, and the step of performing the at least one remote management operation via the private network comprising:
    allowing the first IP connected device to log in the network management system via the public network as a network administrator,
    wherein acting as the network administrator by the first IP connected device is a proxy of the customer service server in the network management system.

6. The customer support method according to claim 5, wherein the at least one channel function comprises one or a combination of a sales function, a planning function, a technical support function, and a customer management function.

7. The customer support method according to claim 6, wherein
    regarding the sales function, the step of establishing the interactive support service based on one of the at least one channel function comprises:
    providing the interactive support service related to product information;
    regarding the planning function, the step of establishing the interactive support service based on one of the at least one channel function comprises:
    providing the interactive support service related to configuring products;
    regarding the technical support function, the step of establishing the interactive support service based on one of the at least one channel function comprises:
    providing the interactive support service related to technical support; and
    regarding the customer management function, the step of establishing the interactive support service based on one of the at least one channel function comprises:
    providing the interactive support service related to customer management.

8. The customer support method according to claim 5, wherein the at least one remote management operation comprises an authorization operation, the step of performing the at least one remote management operation via the private network comprising:
    receiving identity information via the public network, wherein the identity information corresponds to the first IP connected device located in the public network; and
    enabling the at least one remote management operation according to the identity information to thereby complete the authorization operation.

9. A customer service server located in a private network comprising:
    a communication module for transmitting and receiving signals; and
    a processing unit coupled to the communication module and configured to perform the following steps:
    allowing a first Internet Protocol (IP) connected device located in a public network to establish a connection through the communication module;
    connecting to at least one second IP connected device in the private network; and
    providing at least one channel function via the connection for the first IP connected device through the communication module and establishing an interactive support service based on one of the at least one channel function,
    wherein the at least one channel function comprises a maintenance function, the interactive support service comprises at least one remote management operation,
    wherein regarding the maintenance function, the at least one remote management operation comprises:
    a notification operation, wherein in the notification operation, the processing unit monitors links among the customer service server and the at least one second IP connected device in the private network through the communication module, determines whether connection status of the links and log-in records of a network management system match at least one alarm event, and transmits the at least one alarm event to the first IP connected device through the communication module via the public network, wherein the processing unit operates the network management system for controlling the at least one second IP connected device and the customer service server in the private network; and
    a device management operation, wherein in the device management operation, the processing unit allows the first IP connected device to log in the network management system via the public network as a network administrator, wherein acting as the network administrator by the first IP connected device is a proxy of the customer service server in the network management system.

* * * * *